(12) United States Patent
Lilly

(10) Patent No.: US 12,076,878 B1
(45) Date of Patent: Sep. 3, 2024

(54) PIZZA-CUTTING DEVICE

(71) Applicant: Benjamin Lilly, Charlotte, NC (US)

(72) Inventor: Benjamin Lilly, Charlotte, NC (US)

(*) Notice: Subject to any disclaimer, the term of this patent is extended or adjusted under 35 U.S.C. 154(b) by 304 days.

(21) Appl. No.: 17/689,007

(22) Filed: Mar. 8, 2022

(51) Int. Cl.
B26D 3/24 (2006.01)
A21C 15/04 (2006.01)
A47J 47/00 (2006.01)

(52) U.S. Cl.
CPC ............... *B26D 3/24* (2013.01); *A21C 15/04* (2013.01); *A47J 47/005* (2013.01)

(58) Field of Classification Search
CPC ........... B26D 3/24; A21C 15/04; A47J 47/005
USPC ............................................................ 83/160
See application file for complete search history.

(56) References Cited

U.S. PATENT DOCUMENTS

| 2,801,663 | A | 8/1957 | Lindauer | |
| 4,100,676 | A | 7/1978 | Ferguson | |
| 4,250,618 | A | 2/1981 | Custer | |
| D316,656 | S | 5/1991 | Hall | |
| 5,873,294 | A | 2/1999 | Sciuto | |
| 6,557,260 | B1 | 5/2003 | Morris | |
| 10,667,652 | B2 | 6/2020 | Getzinger | |
| 2006/0182861 | A1* | 8/2006 | Arend | B26D 3/08 426/518 |
| 2014/0290069 | A1* | 10/2014 | White, III | B26D 3/24 30/114 |
| 2019/0274317 | A1* | 9/2019 | Graubert | B26B 3/04 |

FOREIGN PATENT DOCUMENTS

| GB | 2441815 A | * | 3/2008 | ............ A21C 15/04 |
| WO | 1997027031 | | 7/1997 | |

* cited by examiner

Primary Examiner — Nhat Chieu Q Do
(74) Attorney, Agent, or Firm — Kyle A. Fletcher, Esq.

(57) ABSTRACT

The pizza cutting device includes a cutting board and a cutting unit. The pizza cutting device cuts a pizza into a plurality of slices. The cutting board holds the pizza. The cutting board and the pizza are inserted into the cutting unit. A cutter within the cutting unit is activated to press a plurality of radial blades into the pizza to form the plurality of slices. A spring within the cutting unit pushes the plurality of radial blades out of the pizza so that the cutting board and the plurality of slices is removed from the cutting unit.

16 Claims, 4 Drawing Sheets

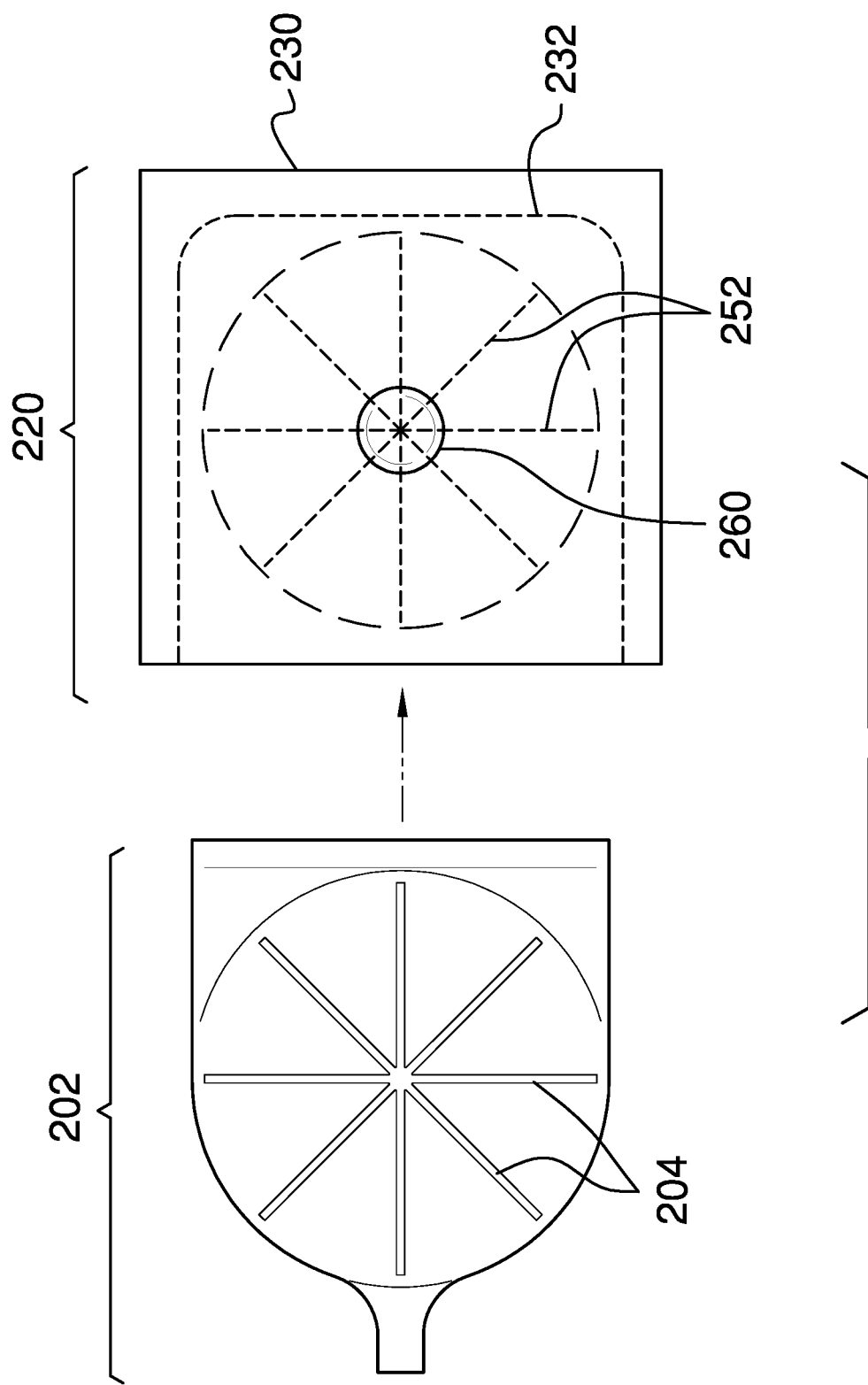

PIZZA-CUTTING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of cutting devices and kitchen accessories, more specifically, a pizza cutting device.

SUMMARY OF INVENTION

The pizza cutting device comprises a cutting board and a cutting unit. The pizza cutting device may cut a pizza into a plurality of slices. The cutting board may be adapted to hold the pizza. The cutting board and the pizza may be inserted into the cutting unit. A cutter within the cutting unit may be activated to press a plurality of radial blades into the pizza to form the plurality of slices. A spring within the cutting unit may push the plurality of radial blades out of the pizza so that the cutting board and the plurality of slices may be removed from the cutting unit.

An object of the invention is to cut a pizza.

Another object of the invention is to provide a cutting board comprising a plurality of radial grooves for placing the pizza into a cutting unit.

A further object of the invention is to provide a cutter comprising a plurality of radial blades that align with the plurality of radial grooves for cutting the pizza into slices when the cutter is pressed down into the pizza.

Yet another object of the invention is to provide a spring to lift the cutter away from the pizza when the cutter is released.

These together with additional objects, features and advantages of the pizza cutting device will be readily apparent to those of ordinary skill in the art upon reading the following detailed description of the presently preferred, but nonetheless illustrative, embodiments when taken in conjunction with the accompanying drawings.

In this respect, before explaining the current embodiments of the pizza cutting device in detail, it is to be understood that the pizza cutting device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pizza cutting device.

It is therefore important that the claims be regarded as including such equivalent construction insofar as they do not depart from the spirit and scope of the pizza cutting device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a top detail view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
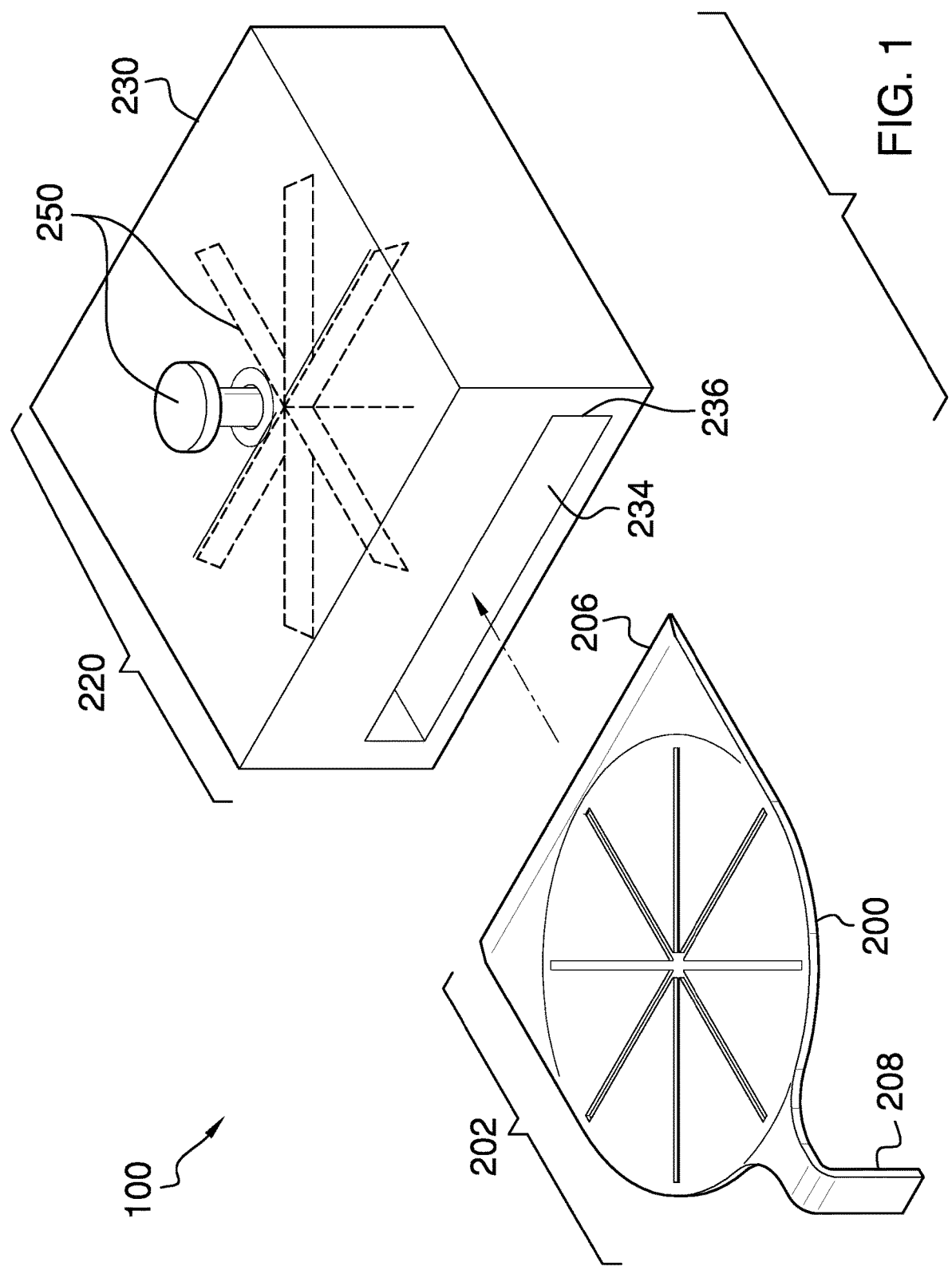
FIG. 1 is an isometric view of an embodiment of the disclosure.
Figure 2:
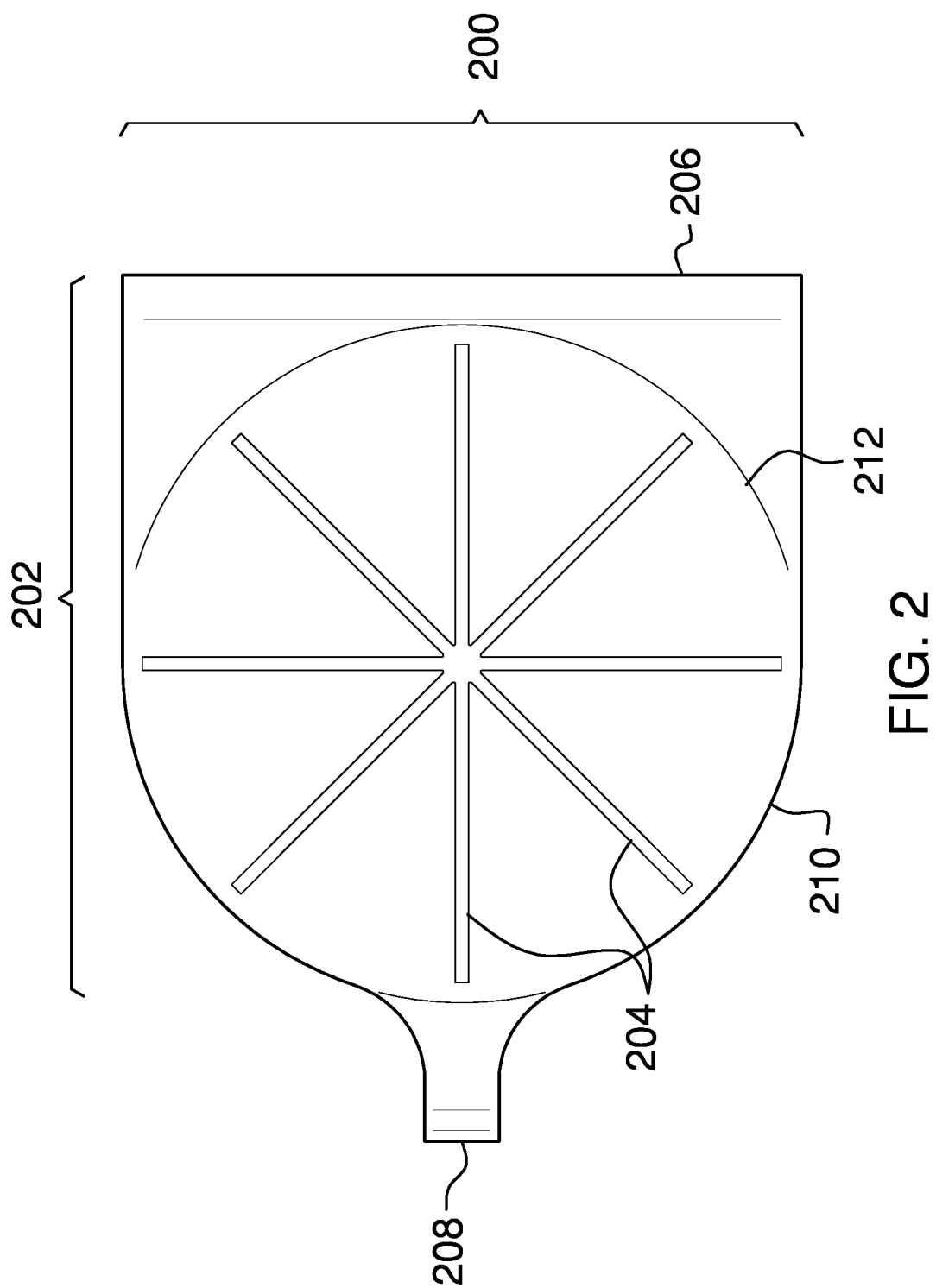
FIG. 2 is a top view of an embodiment of the disclosure illustrating the cutting board.
Figure 3:
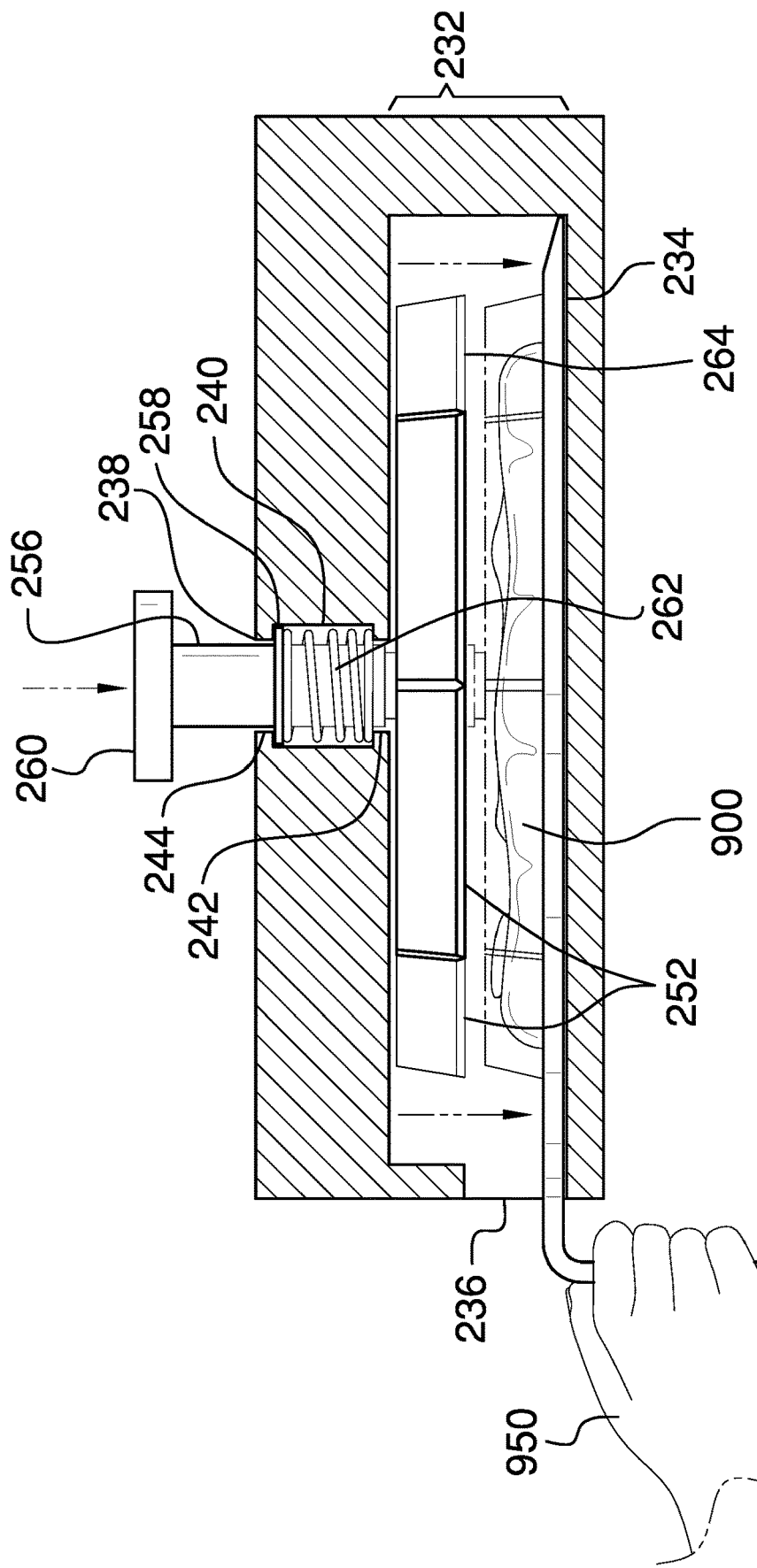
FIG. 3 is a side detail view of an embodiment of the disclosure.

Detailed reference will now be made to a first potential embodiment of the disclosure, which is illustrated in FIGS. 1 through 4.

The pizza cutting device 100 (hereinafter invention) comprises a cutting board 200 and a cutting unit 220. The invention 100 may cut a pizza 900 into a plurality of slices. The cutting board 200 may be adapted to hold the pizza 900. The cutting board 200 and the pizza 900 may be inserted into the cutting unit 220. A cutter 250 within the cutting unit 220 may be activated to press a plurality of radial blades 252 into the pizza 900 to form the plurality of slices. A spring 262 within the cutting unit 220 may push the plurality of radial blades 252 out of the pizza 900 so that the cutting board 200 and the plurality of slices may be removed from the cutting unit 220.

The cutting board 200 may comprise a circular pizza area 202, an alignment edge 206, and a cutting board handle 208. The circular pizza area 202 may be a circular area of the cutting board 200 designated for the pizza 900 to be placed upon. The circular pizza area 202 may be designated by an outline 210 of the cutting board 200, one or more markings or grooves 212 on the surface of the cutting board 200, or any combination thereof.

The circular pizza area 202 may comprise a plurality of radial grooves 204. The plurality of radial grooves 204 may radiate laterally from the center of the circular pizza area 202. The plurality of radial grooves 204 may be equally spaced and may correspond to the cut edges of the plurality of slices. The plurality of radial grooves 204 may provide clearance beneath the pizza 900 for the plurality of radial blades 252 to pass through the pizza 900 as the pizza 900 is being cut.

The alignment edge 206 may be a rectangular distal edge of the cutting board 200. The alignment edge 206 may press against the interior rear wall of the cutting unit 220 to align the plurality of radial grooves 204 within the cutting unit 220. In some embodiments, the alignment edge 206 may be beveled to aid the cutting board 200 sliding under the pizza 900.

The cutting board handle 208 may be a projection from the center of the proximal end of the cutting board 200. The cutting board handle 208 may be adapted for a user 950 to grasp while moving the cutting board 200 into and out of the cutting unit 220. In some embodiments, the cutting board handle 208 may bend downward.

The cutting unit 220 may house the plurality of radial blades 252 and may shield the plurality of radial blades 252 in order to prevent injuries. The cutting unit 220 may align the cutting board 200 such that the plurality of radial blades 252 within the cutting unit 220 land in the plurality of radial grooves 204 of the cutting board 200 when the cutter 250 is activated.

The cutting unit 220 may comprise an enclosure 230. The enclosure 230 may comprise a hollow interior 232. The cutting board 200 may be inserted into the hollow interior 232 via an access aperture 236 located on the front of the enclosure 230. The bottom surface of the hollow interior 232 may comprise a cutting platform 234. The cutting board 200 may rest upon the cutting platform 234 when the cutter 250 is activated.

The top of the enclosure 230 may comprise a cutter handle aperture 238 which may provide a path for a cutter handle to pass through the top of the enclosure 230. The cutter handle aperture 238 may widen to form a spring cavity 240. The spring cavity 240 may house the spring 262 that lifts the cutter 250. The spring cavity 240 may comprise a lower lip 242 and an upper lip 244. The lower lip 242 may be a narrowing of the spring cavity 240 at the bottom of the spring cavity 240. The lower lip 242 may provide a surface for the spring 262 to press against in order to lift the cutter 250. The upper lip 244 may be a narrowing of the spring cavity 240 at the top of the spring cavity 240. The upper lip 244 may limit the upward range of motion of the cutter 250.

The cutter 250 may comprise the plurality of radial blades 252 and the cutter handle. The cutter 250 may move downward when the cutter handle is pressed down. The cutter 250 may move up when the cutter handle is released and the spring 262 pushes up on the cutter 250.

The plurality of radial blades 252 may radiate laterally from the center of the cutter 250. The plurality of radial blades 252 may be equally spaced and may align with the plurality of radial grooves 204 on the cutting board 200. Each of the plurality of radial blades 252 may comprise a cutting edge 264 on the bottom such that the plurality of radial blades 252 may cut the pizza 900 into the plurality of slices when the cutter 250 is pressed down into the pizza 900. In a preferred embodiment, there may be eight (8) blades and grooves.

The cutter handle may comprise a shaft 256 and a knob 260. The shaft 256 may pass through the cutter handle aperture 238 and the spring cavity 240. The bottom of the shaft 256 may be coupled to the center of the plurality of radial blades 252. The top of the shaft 256 may be coupled to the knob 260.

The shaft 256 may comprise a collar 258 that encircles the shaft 256. The collar 258 may be located within the spring cavity 240 and may limit the range of upward motion of the cutter 250 when the collar 258 reaches the upper lip 244.

The knob 260 may be adapted to be pressed by the user 950 in order to activate the cutter 250.

The bottom of the spring 262 may be placed against the lower lip 242 of the spring cavity 240. The top of the spring 262 may be placed against the collar 258 of the cutter 250. The spring 262 may push the cutter 250 up unless the spring 262 is overpowered by a downward force applied to the knob 260.

The sides of the hollow interior 232 may position the cutting board 200 laterally and the interior rear wall of the hollow interior 232 may limit insertion of the cutting board 200 into the cutting unit 220 such that the hollow interior 232 of the cutting unit 220 may position the plurality of radial grooves 204 of the cutting board 200 directly below the plurality of radial blades 252 of the cutter 250.

In use, the pizza 900 may be placed on the cutting board 200 and the cutting board 200 may be inserted into the cutting unit 220. The user 950 may press down on the knob 260 to activate the cutter 250. The plurality of radial blades 252 may be lowered into the pizza 900, cutting the pizza 900 into the plurality of slices. The plurality of radial blades 252 may pass entirely through the pizza 900 and may pass into the plurality of radial grooves 204 beneath the pizza 900, thus assuring that the plurality of slices are completely cut. When the knob 260 is released, the spring 262 may push the cutter 250 up and away from the pizza 900. The cutting board 200 may be removed from the cutting unit 220 and the plurality of slices may be served.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface. Aperture may be synonymous with hole, slit, crack, gap, slot, or opening.

As used in this disclosure, a "cavity" may be an empty space or negative space that is formed within an object.

As used in this disclosure, a "collar" may be a ring like device that is placed around an object.

As used in this disclosure, the word "correspond" may indicate that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "handle" may refer to an object by which a tool, object, or door is held or manipulated with the hand.

As used in this disclosure, the word "interior" may be used as a relational term that implies that an object is located or contained within the boundary of a structure or a space.

As used in this disclosure, the word "lateral" may refer to the sides of an object or movement towards a side. Lateral directions are generally perpendicular to longitudinal directions. "Laterally" may refer to movement in a lateral direction.

As used herein, the words "printed", "marked", and "marking" may refer to a mark that has been made on an object. The process of making the mark may involve printing, lithography, thermal transfer, painting, embossing, molding, burning, silk-screening, drawing, etching, engraving, stenciling, stamping, spraying of pigments, or other processes which result in the controlled change of coloration and/or shape of a surface.

As used in this disclosure, the term "radial" may refer to a direction which is perpendicular to an identified central axis or which projects away from a center point.

As used in this disclosure, the term "shaft" may be used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pizza cutting device comprising:
   a cutting board and a cutting unit;
   wherein the pizza cutting device cuts a pizza into a plurality of slices;
   wherein the cutting board holds the pizza;
   wherein the cutting board and the pizza are inserted into the cutting unit;
   wherein a cutter of the cutting unit includes a plurality of radial blades, wherein the cutter is activated to press the plurality of radial blades into the pizza to form the plurality of slices;
   wherein a spring within the cutting unit retracts the plurality of radial blades out of the pizza so that the cutting board and the plurality of slices are configured to remove from the cutting unit;
   wherein a cutting board handle of the cutting board is a projection from the center of a proximal end of the cutting board;
   wherein the cutting board handle is adapted for a user to grasp while moving the cutting board into and out of the cutting unit;
   wherein the cutting unit comprises an enclosure;
   wherein the enclosure comprises a hollow interior;
   wherein the cutting board is inserted into the hollow interior via an access aperture located on a front of the enclosure;
   wherein a bottom surface of the hollow interior comprises a cutting platform;
   wherein the cutting board rests upon the cutting platform when the cutter is activated,
   wherein the cutting board comprises a circular pizza area that comprises a plurality of radial grooves, wherein the plurality of radial grooves radiate laterally from the center of the circular pizza area; wherein the plurality of radial grooves are equally spaced and correspond to cut edges of the plurality of slices, and wherein the plurality of radial grooves provide clearance beneath the pizza for the plurality of radial blades to pass through the pizza as the pizza is being cut.

2. The pizza cutting device according to claim 1 wherein the cutting board comprises an alignment edge; wherein the circular pizza area is a circular area of the cutting board designated for the pizza to be placed upon; wherein the circular pizza area is designated by an outline of the cutting board, one or more markings on the surface of the cutting board, or any combination thereof.

3. The pizza cutting device according to claim 2
   wherein the alignment edge is a rectangular distal edge of the cutting board;
   wherein the alignment edge presses against the interior rear wall of the cutting unit to align the plurality of radial grooves within the cutting unit.

4. The pizza cutting device according to claim 3
   wherein the alignment edge is beveled to aid the cutting board sliding under the pizza.

5. The pizza cutting device according to claim 4 wherein the cutting board handle bends downward.

6. The pizza cutting device according to claim 4 wherein the cutting unit houses the plurality of radial blades;
wherein the cutting unit aligns the cutting board such that the plurality of radial blades within the cutting unit land in the plurality of radial grooves of the cutting board when the cutter is activated.

7. The pizza cutting device according to claim 6 wherein the top of the enclosure comprises a cutter handle aperture which provides a path for a cutter handle to pass through the top of the enclosure;
wherein the cutter handle aperture widens to form a spring cavity;
wherein the spring cavity houses the spring that lifts the cutter;
wherein the spring cavity comprises a lower lip and an upper lip.

8. The pizza cutting device according to claim 7 wherein the lower lip is a narrowing of the spring cavity at the bottom of the spring cavity;
wherein the lower lip provides a surface for the spring to press against in order to lift the cutter;
wherein the upper lip is a narrowing of the spring cavity at the top of the spring cavity;
wherein the upper lip limits the upward range of motion of the cutter.

9. The pizza cutting device according to claim 8 wherein the cutter comprises the cutter handle;
wherein the cutter moves downward when the cutter handle is pressed down;
wherein the cutter moves up when the cutter handle is released and the spring pushes up on the cutter.

10. The pizza cutting device according to claim 9 wherein the plurality of radial blades radiate laterally from the center of the cutter;
wherein the plurality of radial blades are equally spaced and align with the plurality of radial grooves on the cutting board.

11. The pizza cutting device according to claim 10 wherein each of the plurality of radial blades comprise a cutting edge on the bottom such that the plurality of radial blades cut the pizza into the plurality of slices when the cutter is pressed down into the pizza.

12. The pizza cutting device according to claim 11 wherein the cutter handle comprises a shaft and a knob;
wherein the shaft passes through the cutter handle aperture and the spring cavity;
wherein the bottom of the shaft is coupled to the center of the plurality of radial blades;
wherein the top of the shaft is coupled to the knob.

13. The pizza cutting device according to claim 12 wherein the shaft comprises a collar that encircles the shaft;
wherein the collar is located within the spring cavity and limits the range of upward motion of the cutter when the collar reaches the upper lip.

14. The pizza cutting device according to claim 5 wherein the knob is adapted to be pressed by the user in order to activate the cutter.

15. The pizza cutting device according to claim 14 wherein the bottom of the spring is placed against the lower lip of the spring cavity;
wherein the top of the spring is placed against the collar of the cutter;
wherein the spring pushes the cutter up unless the spring is overpowered by a downward force applied to the knob.

16. The pizza cutting device according to claim 15 wherein the sides of the hollow interior position the cutting board laterally and the interior rear wall of the hollow interior limits insertion of the cutting board into the cutting unit such that the hollow interior of the cutting unit positions the plurality of radial grooves of the cutting board directly below the plurality of radial blades of the cutter.

\* \* \* \* \*